United States Patent Office 2,762,809
Patented Sept. 11, 1956

2,762,809

2,3-DIALKOXY - 6 - NITRO - 9 - (HYDROXYALKYL-AMINOALKYLAMINO) ACRIDINES AND THEIR PREPARATION

Edgar Alfred Steck, Guilderland, N. Y., assignor to Sterling Drug Inc., New York, N. Y., a corporation of Delaware No Drawing. Application October 27, 1953, Serial No. 388,697

20 Claims. (Cl. 260—279)

This invention relates to 2,3-dialkoxy-6-nitro-9-(hydroxyalkylaminoalkylamino)acridines and the method of preparing these acridines.

The acridine compounds of my invention have in free base form the structure

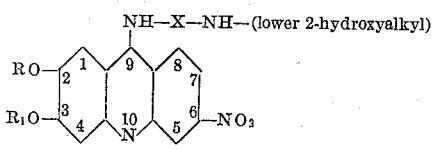

where R and $R_1$ are each lower alkyl radicals having one to six carbon atoms inclusive and X is a lower alkylene radical having from two to eight carbon atoms inclusive and having its free valence bonds on different carbon atoms. These compounds have been found to possess valuable chemotherapeutic properties, for instance, antibacterial and antirickettsial activities.

In the above general formula the lower alkylene radical designated as X has two to eight carbon atoms including such examples as

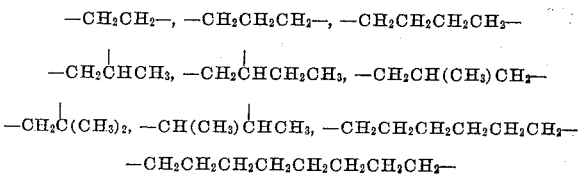

—CH₂CH₂CH₂CH₂CH₂CH₂CH₂CH₂— and the like. The lower 2-hydroxyalkyl radical of the above formula has preferably two to six carbon atoms, encompassing such radicals having a hydroxy group attached to the carbon atom that is one carbon atom removed from the side chain nitrogen atom, such lower 2-hydroxyalkyl radicals including 2-hydroxyethyl, 2-hydroxypropyl, 2-hydroxy-2-methylpropyl, 2-hydroxybutyl, 2-hydroxy-2-methylpentyl, 2-hydroxyhexyl, and the like. The lower alkyl radicals R and $R_1$ having one to six carbon atoms, can be the same or different and include such radicals as methyl, ethyl, n-propyl, isopropyl, n-butyl, isobutyl, n-pentyl, n-hexyl, and the like.

My 2,3 - dialkoxy - 6 - nitro - 9 - (hydroxyalkylaminoalkylamino)acridines were prepared preferably by heating a mixture of phenol and the appropriate 2,3-dialkoxy-6-nitro-9-haloacridine to form the corresponding 2,3-dialkoxy-6-nitro-9-phenoxyacridine as the hydrohalide, which did not need to be isolated, and then heating the 2,3-dialkoxy-6-nitro-9-phenoxyacridine hydrohalide with the appropriate hydroxyalkylaminoalkylamine having the formula H₂N—X—NH—(lower 2-hydroxyalkyl) where X and the 2-hydroxyalkyl radical are defined and illustrated above. The 2,3-dialkoxy-6-nitro-9-chloroacridines are preferably used because of their ready availability and ease of preparation. Illustrative of this preparation is the reaction of 2,3-dimethoxy-6-nitro-9-chloroacridine with phenol to form 2,3-dimethoxy-6-nitro-9-phenoxyacridine monohydrochloride which on treatment, in either pure form or crude form (as directly obtained from the reaction mixture of the first step), with 2-(2-hydroxyethylamino) ethylamine yields 2,3-dimethoxy-6-nitro-9-[2-(2-hydroxyethylamino)ethylamino]acridine.

Alternatively, the 2,3-dialkoxy-6-nitro-9-(hydroxyalkylaminoalkylamino)acridines of my invention can be prepared by directly heating the appropriate 9-haloacridine with a hydroxyalkylaminoalkylamine, without first reacting the former compound with phenol.

The 2,3 - dialkoxy - 6 - nitro - 9 - (hydroxyalkylaminoalkylamino)acridines of my invention are therapeutically active whether employed in the form of their free bases or in the form of their salts with relatively non-toxic organic or inorganic acids. These salts can be prepared by treating the appropriate 2,3-dialkoxy-6-nitro-9-(hydroxyalkylaminoalkylamino)acridine described above with the appropriate acid. In practicing the invention, it has been found convenient to isolate the compounds in the form of their hydrochlorides. However, other acid addition salts are within the scope of the invention. Such salts include the hydrobromides, hydroiodides, sulfates, phosphates, citrates, sulfamates, tartrates, succinates, acetates, benzoates, oleates, and the like.

The following examples further illustrate specific embodiments of the invention.

EXAMPLE 1

*2,3-dimethoxy-6-nitro-9-[2-(2-hydroxyethylamino)-ethylamino]acridine*

A melt comprised of 25 g. of phenol and 10.6 of 2,3-dimethoxy-6-nitro-9-chloroacridine was stirred under reflux at 70° C. The heat was removed and 4.5 g. of 2-(2-hydroxyethylamino)ethylamine was added at such a rate that the temperature did not exceed 95° C. At the end of the addition, heating was resumed for one hour; and then the mixture was cooled to about 40° C., poured into a well-stirred solution of 50 ml. of concentrated hydrochloric acid in 300 ml. of acetone at 20° C. and the resulting mixture was stirred for an hour or two. The precipitate that formed was collected and leached well with acetone to remove phenol. The crude product was dissolved in 1.1 liter of water at 70–75° C., decolorizing charcoal was added and the mixture was filtered. The filtrate, kept at 40–45° C., was treated with 200 ml. of concentrated hydrochloric acid and allowed to cool very slowly. The resulting precipitate was collected, slurried with acetone, and washed with acetone and ether. This product, 2,3 - dimethoxy - 6 - nitro - 9 - [2 - (2 - hydroxyethylamino)ethylamino]acridine dihydrochloride, existing as scarlet needles, melted at 240–243° C. (this melting point and subsequent melting points of the acridines of the invention occurred with decomposition unless otherwise noted) after having been dried in vacuo below 50° C. to avoid loss of HCl.

*Analysis.*—Calcd. for $C_{19}H_{22}N_4O_5 \cdot 2HCl \cdot 1/2\ H_2O$: N, 11.96; Cl, 15.14; $H_2O$, 1.92. Found: N, 11.73; Cl, 15.22; $H_2O$, 2.04.

The anhydrous form of 2,3-dimethoxy-6-nitro-9-[2-(2-hydroxyethylamino)ethylamino]acridine dihydrochloride was obtained by prolonged drying of the hemihydrate at 100° C. and 0.5 mm., and replacing lost HCl by action of an absolute ether solution of hydrogen chloride. The product was washed with a 5:1 ether:ethanol solution and dried, yielding scarlet microcrystals melting at 260–263° C.

*Analysis.*—Calcd. for $C_{19}H_{22}N_4O_5 \cdot 2HCl$: N, 12.20; Cl, 15.44. Found: N, 12.43; Cl, 15.42.

Following the above procedure in the absence of phenol, i. e., heating 2,3-dimethoxy-6-nitro-9-chloroacridine directly with 2-(2-hydroxyethylamino)ethylamine, the same product, 2,3-dimethoxy-6-nitro-9-[2-(2-hydroxyethylamino)ethylamino]acridine dihydrochloride, can be obtained.

Other compounds, in the form of their dihydrochlorides, that can be prepared following the foregoing procedure using the appropriate reactants include the following: 2,3 - diethoxy - 6 - nitro - 9 - [2 - (2 - hydroxyethylamino)ethylamino]acridine, 2 - methoxy-3-ethoxy-6-nitro - 9 - [3-(2-hydroxybutylamino)butylamino]acridine, 2,3-di-n-hexoxy-6-nitro-9-[4 - (2 - hydroxy - 2 - methyl - propylamino)pentylamino]acridine, 2,3-di-isobutoxy-6-nitro-9-[8-(2-hydroxyethylamino) octylamino]acridine, and the like.

EXAMPLE 2

*2,3-dimethoxy-6-nitro-9-[2-(2-hydroxypropylamino)-ethylamino]acridine*

This compound was prepared following the procedure described for Example 1 using 35 g. of phenol, 9.56 g. of 2,3-dimethoxy-6-nitro-9-chloroacridine and 4.3 g. of 2-(2-hydroxypropylamino)ethylamine. The product, orange microcrystals in the form of its dihydrochloride, melted at 250–251° C.

*Analysis.*—Calcd. for $C_{20}H_{24}N_4O_5 \cdot 2HCl$: N, 11.84; Cl, 14.98. Found: N, 11.99; Cl, 14.80.

EXAMPLE 3

*2,3-dimethoxy-6-nitro-9-[2-(2-hydroxy-2-methylpropylamino)ethylamino]acridine*

This compound was prepared following the procedure described for Example 1 using 35 g. of phenol, 9.56 g. of 2,3-dimethoxy-6-nitro-9-chloroacridine and 4.8 g. of 2-(2-hydroxy-2-methylpropylamino)ethylamine. The product was obtained as orange needlets in the form of its dihydrochloride hemihydrate, M. P. 253–257° C.

*Analysis.*—Calcd. for $C_{21}H_{26}N_4O_5 \cdot 2HCl \cdot 1/2H_2O$: N, 11.29; Cl, 14.29; $H_2O$, 1.81. Found: N, 11.19; Cl, 14.39; $H_2O$, 1.82.

EXAMPLE 4

*2,3-dimethoxy-6-nitro-9-[3-(2-hydroxy-2-methylpropylamino)propylamino]acridine*

This preparation was carried out following the procedure described for Example 1 using 35 g. of phenol, 9.56 g. of 2,3-dimethoxy-6-nitro-9-chloroacridine and 5.0 g. of 3 - (2-hydroxy-2-methylpropylamino)propylamine. The product was obtained as brick red needlets in the form of its dihydrochloride, M. P. 235–235.5° C.

*Analysis.*—Calcd. for $C_{22}H_{28}N_4O_5 \cdot 2HCl$: N, 11.17; Cl, 14.14. Found: N, 11.01; Cl, 14.19.

EXAMPLE 5

*(a) 7-(2-hydroxyethylamino)heptylamine*

A solution of 33.3 g. (0.26 m.) 1,7-heptylenediamine in 100 ml. of 90% methanol was stirred at 0° C. in a flask equipped with condenser through which brine was circulated at −10° C. To this there was added 12 ml. (10.6 g., 0.24 m.) of liquefied ethylene oxide contained in a jacketed dropping funnel having brine circulated through the jacket. When addition had been completed (ca. half an hour), the reaction-mixture was allowed to warm to room temperature, and the resulting reaction caused the temperature to rise to 40° C. The mixture was stirred for three hours, then refluxed for one hour before fractionation. A yield of 20.9 g. of 7-(2-hydroxyethylamino)heptylamine, was collected at 164–168° C. (1 mm.); $n_D^{25}$ 1.4751.

*Analysis.*—Calcd. for $C_9H_{22}N_2O$: N, 16.08. Found: N, 16.10.

*(b) 2,3-dimethoxy-6-nitro-9-[7-(2-hydroxyethylamino)heptylamino]acridine*

This acridine derivative was prepared following the procedure described for Example 1 using 30 g. of phenol, 9.5 g. of 2,3-dimethoxy-6-nitro-9-chloroacridine and 6.5 g. of 7-(2-hydroxyethylamino)heptylamine. The product was obtained as scarlet microcrystals in the form of its dihydrochloride, M. P. 238–239° C.

*Analysis.*—Calcd. for $C_{24}H_{32}N_4O_5 \cdot 2HCl$: N, 10.58; Cl, 13.39. Found: N, 10.48; Cl, 13.46.

EXAMPLE 6

*2,3-dimethoxy-6-nitro-9-[3-(2-hydroxyethylamino)-propylamino]acridine*

This compound was prepared following the procedure described for Example 1 using 30 g. of phenol, 8.25 g. of 2,3-dimethoxy-6-nitro-9-chloroacridine and 3.8 g. of 3-(2-hydroxyethylamino)propylamine. The product was obtained as brick red microcrystals in the form of its dihydrochloride dihydrate, M. P. 228–228.5° C.

*Analysis.*—Calcd. for $C_{20}H_{24}N_4O_5 \cdot 2HCl \cdot 2H_2O$: N, 11.00; Cl, 13.92; $H_2O$, 7.07. Found: N, 11.00; Cl, 13.88; $H_2O$, 6.90.

The above 2,3-dialkoxy-6-nitro-9-(hydroxylalkylaminoalkylamino)acridines of my invention have bacteriostatic and bactericidal activity against many organisms, including the following: *Streptococcus pyogenes*, *Eberthella typhosa*, *Brucella abortus*, *Mycobacterium tuberculosis* and *Clostridium welchii*. In addition, these compounds have antirickettsial activity, e. g., against epidemic typhus, as determined by the chick embryo technique.

As illustrated by the foregoing examples, the preparation of my 2,3-dialkoxy-6-nitro-9-(hydroxyalkylaminoalkyl)acridines was carried out under acidic conditions. When the reactant was a 2,3-dialkoxy-6-nitro-9-haloacridine, an acidic medium was afforded by the presence of the hydrohalic acid formed in the reaction. When the reactant was a 2,3-dialkoxy-6-nitro-9-phenoxyacridine, acidic conditions were produced either by using the 9-phenoxy compound in the form of its hydrohalic acid addition salt or by adding a small amount of a mineral acid.

I claim:

1. A compound selected from the group consisting of a 2,3 - dialkoxy-6-nitro - 9 - (hydroxyalkylaminoalkylamino)acridine having the structure where R and $R_1$ are each lower alkyl radicals having one to six carbon atoms inclusive and X is a lower alkylene radical having from two to eight carbon atoms inclusive and having its free valence bonds on different carbon atoms, and acid addition salts thereof.

2. A 2,3-dialkoxy - 6 - nitro - 9 - (hydroxyalkylaminoethylamino)acridine having the structure where R and $R_1$ are each lower alkyl radicals having one to six carbon atoms inclusive.

3. A 2,3 - dialkoxy - 6 - nitro - 9 - (hydroxyalkylpropylamino)acridine having the structure where R and $R_1$ are each lower alkyl radicals having one to six carbon atoms inclusive.

4. A 2,3-dimethoxy-6-nitro-9-(hydroxyalkylaminoethyl-amino)acridine having the structure

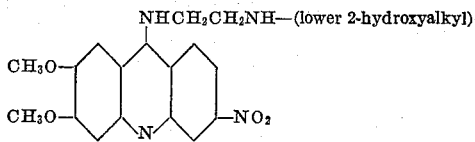

5. A 2,3-dimethoxy-6-nitro-9-(hydroxyalkylaminopropylamino)acridine having the structure

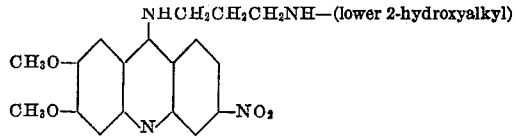

6. 2,3-dimethoxy-6-nitro - 9-[2-(2-hydroxyethylamino)-ethylamino]acridine.

7. 2,3-dimethoxy - 6-nitro - 9-[2-(2-hydroxypropylamino)ethylamino]acridine.

8. 2,3-dimethoxy - 6-nitro - 9-[2-(2-hydroxy - 2-methylpropylamino)ethylamino]acridine.

9. 2,3-dimethoxy - 6-nitro - 9-[3-(2-hydroxy - 2-methylpropylamino)propylamino]acridine.

10. 2,3-dimethoxy - 6 - nitro - 9-[7-(2-hydroxyethylamino)heptylamino]acridine.

11. The process of preparing a 2,3-dialkoxy-6-nitro-9-(hydroxyalkylaminoalkylamino)acridine having the structure

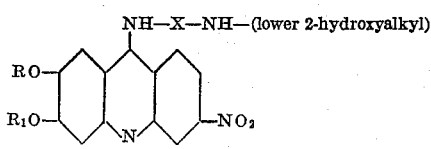

where R and R₁ are each lower alkyl radicals having one to six carbon atoms inclusive and X is a lower alkylene radical having from two to eight carbon atoms inclusive and having its free valence bonds on different carbon atoms, which comprises heating a member of the group consisting of the corresponding 2,3-dialkoxy-6-nitro-9-haloacridine and 2,3-dialkoxy-6-nitro-9-phenoxyacridine with a hydroxyalkylaminoalkylamine having the formula H₂N—X—NH—(lower 2-hydroxyalkyl) under acidic conditions.

12. The process of preparing a 2,3-dialkoxy-6-nitro-9-(hydroxyalkylaminoethylamino)acridine having the structure

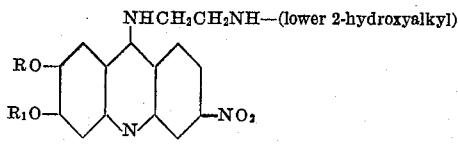

where R and R₁ are each lower alkyl radicals having one to six carbon atoms inclusive, which comprises heating the corresponding 2,3-dialkoxy-6-nitro-9-phenoxyacridine with a hydroxyalkylaminoethylamine having the formula H₂NCH₂CH₂NH—(lower 2-hydroxyalkyl) under acidic conditions.

13. The process of preparing a 2,3-dialkoxy-6-nitro-9-(hydroxyalkylpropylamino)acridine having the structure

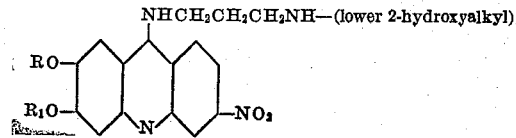

where R and R₁ are each lower alkyl radicals having one to six carbon atoms inclusive, which comprises heating the corresponding 2,3-dialkoxy-6-nitro-9-phenoxyacridine with a hydroxyalkylaminopropylamine having the formula H₂NCH₂CH₂CH₂NH—(lower 2 - hydroxyalkyl) under acidic conditions.

14. The process of preparing a 2,3-dimethoxy-6-nitro-9-(hydroxyalkylaminoethylamino)acridine having the structure

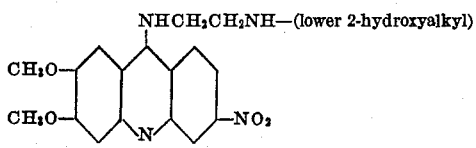

which comprises heating the corresponding 2,3-dimethoxy-6-nitro-9-phenoxyacridine with a hydroxyalkylaminoethylamine having the formula H₂NCH₂CH₂NH—(lower 2-hydroxyalkyl) under acidic conditions.

15. The process of preparing a 2,3-dimethoxy - 6-nitro-9 - (hydroxyalkylaminopropylamino)acridine having the structure

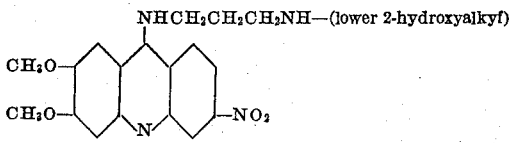

which comprises heating the corresponding 2,3-dimethoxy-6-nitro-9-phenoxyacridine with a hydroxyalkylaminopropylamine having the formula H₂NCH₂CH₂CH₂NH—(lower 2-hydroxyalkyl) under acidic conditions.

16. The process of preparing 2,3-dimethoxy-6-nitro-9-[2 - (2 - hydroxyethylamino)ethylamino]acridine which comprises heating 2,3-dimethoxy-6-nitro - 9-phenoxyacridine hydrochloride with 2-(2-hydroxyethylamino)ethylamine.

17. The process of preparing 2,3-dimethoxy-6-nitro-9-[2 - (2 - hydroxypropylamino)ethylamino]acridine which comprises heating 2,3-dimethoxy-6-nitro - 9-phenoxyacridine hydrochloride with 2-(2-hydroxypropylamino)ethylamine.

18. The process of preparing 2,3-dimethoxy-6-nitro-9-[2-(2-hydroxy - 2 - methylpropylamino)ethylamino]acridine which comprises heating 2,3-dimethoxy - 6 - nitro-9-phenoxyacridine hydrochloride with 2 - (2 - hydroxy-2-methylpropylamino)ethylamine.

19. The process of preparing 2,3-dimethoxy-6-nitro-9-[3-(2-hydroxy - 2 - methylpropylamino)propylamino]-acridine which comprises heating 2,3-dimethoxy-6-nitro-9-phenoxyacridine hydrochloride with 3-(2-hydroxy-2-methylpropylamino)propylamine.

20. The process of preparing 2,3-dimethoxy-6-nitro-9-[7 - (2 - hydroxyethylamino)heptylamino]acridine which comprises heating 2,3-dimethoxy-6-nitro-9-phenoxyacridine hydrochloride with 7-(2-hydroxyethylamino)heptylamine.

References Cited in the file of this patent

UNITED STATES PATENTS

| | | |
|---|---|---|
| 1,962,277 | Jensch | June 12, 1934 |
| 2,531,010 | Surrey | Nov. 21, 1950 |
| 2,531,012 | Surrey | Nov. 21, 1950 |
| 1,647,900 | Surrey | Aug. 4, 1953 |